United States Patent [19]
Colle et al.

[11] Patent Number: 5,874,660
[45] Date of Patent: Feb. 23, 1999

[54] METHOD FOR INHIBITING HYDRATE FORMATION

[75] Inventors: Karla Schall Colle; Russell Harlan Oelfke, both of Houston, Tex.; Malcolm A. Kelland, Røyneberg, Norway

[73] Assignee: Exxon Production Research Company, Houston, Tex.

[21] Appl. No.: 539,033

[22] Filed: Oct. 4, 1995

Related U.S. Application Data

[60] Provisional application No. 60/000,053 Jun. 8, 1995.

[51] Int. Cl.$^6$ .................................. C07C 7/20; F17D 1/05
[52] U.S. Cl. .............................. 585/15; 585/950; 95/153; 166/310; 166/371; 137/3; 137/13
[58] Field of Search ......................... 585/15, 950; 95/153; 166/310, 371; 137/3, 13

[56] References Cited

U.S. PATENT DOCUMENTS

| | | | |
|---|---|---|---|
| 3,696,085 | 10/1972 | Lederer et al. | 260/80.3 |
| 4,132,535 | 1/1979 | Rivers, Jr. et al. | 55/23 |
| 4,973,775 | 11/1990 | Sugier et al. | 585/15 |
| 5,244,878 | 9/1993 | Sugier et al. | 507/90 |
| 5,331,105 | 7/1994 | Duncum et al. | 585/800 |
| 5,420,370 | 5/1995 | Sloan, Jr. | 585/15 |
| 5,426,258 | 6/1995 | Thomas et al. | 585/15 |
| 5,432,292 | 7/1995 | Sloan, Jr. | 585/15 |
| 5,434,323 | 7/1995 | Durand et al. | 585/15 |
| 5,491,269 | 2/1996 | Colle et al. | 585/15 |
| 5,639,925 | 6/1997 | Sloan, Jr. et al. | 585/15 |

FOREIGN PATENT DOCUMENTS

| | | | |
|---|---|---|---|
| 0 095730 | 5/1983 | European Pat. Off. | 220/56 |
| 83305356.4 | 3/1984 | European Pat. Off. | C08F 26/10 |
| 2 102 441 | 12/1981 | United Kingdom | 226/2 |
| PCT/EP93/01519 | 12/1993 | WIPO | E21B 37/06 |
| PCT/US93/11191 | 6/1994 | WIPO | E21B 37/06 |
| PCT/US95/06042 | 11/1995 | WIPO | E21B 37/06 |

OTHER PUBLICATIONS

*Polymers In Aqueous Media—Performance Through Association Advances in Chemistry Series,* 223, Americal Chemical Society Washington, DC, 1989, D.N. Schulz et al., Chp 9 "Copolymers of N–Vinylpyrrolidone and Sulfonate Monomers", pp. 165–174 (no month available).

"Kinetic Inhibition of Natural Gas Hydrates in Offshore Drilling, Production, and Processing", E. D. Sloan, Jr. et al., Draft Report maiden to each member of the Colorado School of Mines Gas Hydrate Consortium of Jan. 2, 1996*.

*Primary Examiner*—Walter D. Griffin
*Attorney, Agent, or Firm*—Kurt D. VanTassel; Denise Y. Wolfs

[57] ABSTRACT

A method for inhibiting the formation of clathrate hydrates in a fluid having hydrate forming constituents is disclosed. More specifically, the method can be used in treating a petroleum fluid stream such as natural gas conveyed in a pipe to inhibit the formation of a hydrate restriction in the pipe. The hydrate inhibitor used for practicing the method is selected from the family of substantially water soluble copolymers formed from N-methyl-N-vinylacetamide (VIMA) and one of three comonomers, vinylpyrrolidone (VP), vinylpiperidone (VPip), or vinylcaprolactam (VCap). VIMA/VCap is the preferred copolymer. These copolymers may be used alone or in combination with each other or other hydrate inhibitors. Preferably, a solvent, such as water, brine, alcohol, or mixtures thereof, is used to produce an inhibitor solution or mixture to facilitate treatment of the petroleum fluid stream.

16 Claims, 1 Drawing Sheet

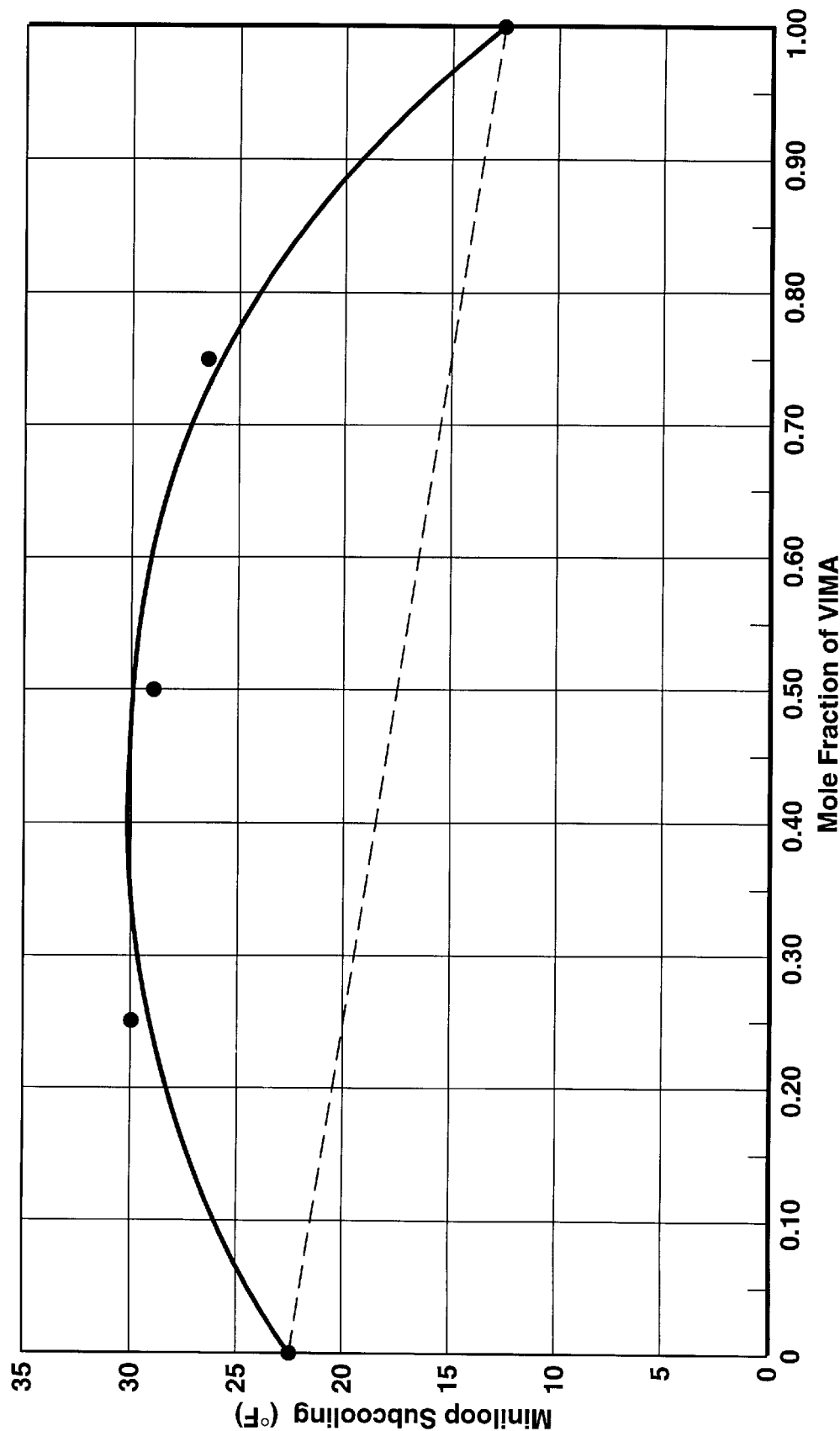

METHOD FOR INHIBITING HYDRATE FORMATION

This application is based on U.S. provisional patent application, Ser. No. 60/000,053, and is related to U.S. provisional patent application, Ser. No. 60/000,065, both filed in the name of K. S. Colle et al. on Jun. 8, 1995.

FIELD OF THE INVENTION

The present invention relates to a method for inhibiting the formation of clathrate hydrates in a fluid. More specifically, the invention relates to a method for inhibiting the formation of gas hydrates in a pipe used to convey oil or gas.

BACKGROUND OF THE INVENTION

Carbon dioxide, hydrogen sulfide, and various hydrocarbons, such as methane, ethane, propane, normal butane and isobutane, are present in natural gas and other petroleum fluids. However, water is typically found mixed in varying amounts with such petroleum fluid constituents. Under conditions of elevated pressure and reduced temperature clathrate hydrates can form when such petroleum fluid constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane, and benzene. Some hydrate forming gases include, but are not limited to, oxygen, nitrogen, hydrogen sulfide, carbon dioxide, sulfur dioxide, and chlorine.

Gas hydrate crystals or gas hydrates are a class of clathrate hydrates of particular interest to the petroleum industry because of the pipeline blockages that they can produce during the production and/or transport of the natural gas and other petroleum fluids. For example, at a pressure of about 1 MPa ethane can form gas hydrates at temperatures below 4° C., and at a pressure of 3 MPa ethane can form gas hydrates at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, can be difficult because significant amounts of time, energy, and materials, as well as various engineering adjustments, are often required to safely remove the hydrate blockage.

A variety of measures have been used by the oil and gas industry to prevent the formation of hydrate blockages in oil or gas streams. Such measures include maintaining the temperature and/or pressure outside hydrate formation conditions and introducing an antifreeze such as methanol, ethanol, propanol, or ethylene glycol. From an engineering standpoint, maintaining temperature and/or pressure outside hydrate formation conditions requires design and equipment modifications, such as insulated or jacketed piping. Such modifications are costly to implement and maintain. The amount of antifreeze required to prevent hydrate blockages is typically between 10% to 30% by weight of the water present in the oil or gas stream. Consequently, several thousand gallons per day of such solvents can be required. Such quantities present handling, storage, recovery, and potential toxicity issues to deal with. Moreover, these solvents are difficult to completely recover from the production or transportation stream.

Consequently, there is a need for a gas hydrate inhibitor that can be conveniently mixed at low concentrations in the produced or transported petroleum fluids. Such an inhibitor should reduce the rate of nucleation, growth, and/or agglomeration of gas hydrate crystals in a petroleum fluid stream and thereby inhibit the formation of a hydrate blockage in the pipe conveying the petroleum fluid stream.

One method of practicing the present invention uses gas hydrate inhibitors which can be used in the concentration range of about 0.01% to about 5% by weight of the water present in the oil or gas stream. As discussed more fully below, the inhibitors of this invention can effectively treat a petroleum fluid having a water phase.

SUMMARY OF THE INVENTION

According to the invention there is provided a method for inhibiting the formation of clathrate hydrates in a fluid having hydrate forming constituents. The method comprises treating said fluid with an inhibitor having a substantially water soluble copolymer selected from the group consisting of the following N-vinyl amide/lactam copolymers:

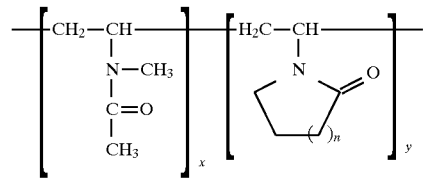

where n ranges from one to three and the sum of x and y is an average number sufficient to produce an average molecular weight between about 1,000 to about 6,000,000.

BRIEF DESCRIPTION OF THE DRAWING

FIG. 1 illustrates (1) a "best fit" curve (solid) based on the miniloop subcooling performance of three different copolymer compositions of N-methyl-N-vinylacetamide/vinylcaprolactam (VIMA/VCap) having 25%, 50%, 75% mole fractions of VIMA and two homopolymer compositions including poly(N-methyl-N-vinylacetamide) and polyvinylcaprolactam, and (2) a linear line (dashed) representing the approximate arithmetic average in subcooling performance that was expected over the same range of VIMA/VCap copolymer compositions.

DETAILED DESCRIPTION OF THE INVENTION

Inventive Method

The inventive method inhibits the formation of clathrate hydrates in a fluid having hydrate forming constituents. Formation of clathrate hydrates means the nucleation, growth, and/or agglomeration of clathrate hydrates. Such clathrate hydrates may be formed in a fluid whether it is flowing or substantially stationary, but are often most problematic in flowing fluid streams conveyed in a pipe. For example, flow restrictions arising from partial or complete blockages in a fluid stream can arise as clathrate hydrates adhere to and accumulate along the inside wall of the pipe used to convey the fluid. Nonetheless, the invention can be used for inhibiting formation of clathrate hydrates in substantially stationary fluids.

In one embodiment of the invention, a concentrated solution or mixture of one or more of the inhibitors of the type described below is introduced into a petroleum fluid stream having an aqueous phase. As the inhibitor solution or mixture of this invention is substantially dissolved in the aqueous phase or dispersed in the fluid stream it reduces the rate that clathrate hydrates are formed, and thereby reduces the tendency for a flow restriction to occur.

In a preferred embodiment, the solid polymer is first dissolved into an appropriate carrier solvent or liquid to make a concentrated solution or mixture. It should be understood that many liquids may effectively facilitate treatment of the fluid stream without dissolving the inhibitor. Many liquids, however, will preferably dissolve the inhibitor and, for convenience, are referred to hereafter as solvents whether they produce an inhibitor solution, emulsion, or other type of mixture. The solvent's principal purpose is to act as a carrier for the inhibitor and to facilitate the inhibitor's absorption into the aqueous phase of the petroleum fluid. Any solvent suitable for delivering the inhibitor to the fluid's aqueous phase may be used. Such solvents include, but are not limited to, water, brine, sea water, produced water, methanol, ethanol, propanol, isopropanol, glycol, or mixtures of such solvents. Other solvents familiar to those skilled in the art may also be used.

It should be understood that the use of a carrier solvent is not required to practice the invention, but it is a convenient method of introducing the inhibitor into the fluid. In many applications the use of a carrier solvent will facilitate treatment of the fluid stream.

Any convenient concentration of inhibitor in the carrier solvent can be used, so long as it results in the desired final concentration in the aqueous phase of the petroleum fluid. Higher concentrations are preferred, since they result in a reduced volume of concentrated solution to handle and introduce into the petroleum fluid. The actual concentration used in a specific application will vary depending upon the selection of carrier solvent the chemical composition of the inhibitor, the system temperature, and the inhibitor's solubility in the carrier solvent at application conditions.

The inhibitor mixture is introduced into the aqueous phase of the petroleum fluid using mechanical equipment, such as, chemical injection pumps, piping tees, injection fittings, and other devices which will be apparent to those skilled in the art. However, such equipment is not essential to practicing the invention. To ensure an efficient and effective treatment of the petroleum fluid with the inhibitor mixture two points should be considered.

First an aqueous phase is preferably present at the location the inhibitor solution is introduced into the fluid. In some petroleum fluid systems (particularly natural gas systems), an aqueous phase does not appear until the gas has cooled sufficiently for water to condense. If this is the case, the inhibitor solution is preferably introduced after the water has condensed. Alternatively, in the event that an aqueous phase is not available at the point the inhibitor solution is introduced, the inhibitor solution concentration should be selected to ensure that the inhibitor solution's viscosity is sufficiently low to facilitate its dispersion through the fluid and permit it to reach the aqueous phase.

Second, because the inhibitor primarily serves to inhibit the formation of clathrate hydrates, rather than reverse such formation, it is important to treat the fluid prior to substantial formation of clathrate hydrates. As a wet petroleum fluid cools it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and its composition change. Various methods of determining a fluid's $T_{eq}$ at various fluid compositions and pressures are well known to those skilled in the art. Preferably, the fluid should be treated with the inhibitor when the fluid is at a temperature greater than its $T_{eq}$. It is possible, but not preferable, to introduce the inhibitor while the temperature is at or slightly below the fluid's $T_{eq}$, preferably before clathrate hydrates have begun to form.

The quantity of inhibitor introduced into a petroleum fluid with an aqueous phase solvent will typically vary between about 0.01 wt % to about 5 wt % by weight of the water present in the fluid. Preferably, the inhibitor concentration will be about 0.5 wt %. For example, a laboratory study has shown that adding 0.5 wt % of a copoylmer of N-methyl-N-vinylacetamide and vinylcaprolactam (VIMA/VCap) to a petroleum fluid allowed the fluid to cool to a temperature which was about 16.7° C. below its $T_{eq}$ without formation of a hydrate blockage. A higher inhibitor concentration can be used to lower the temperature at which a hydrate blockage is obtained. A suitable concentration for a particular application, however, can be determined by those skilled in the art by taking into account the inhibitor's performance under such application, the degree of inhibition required for the petroleum fluid, and the inhibitor's cost.

Inhibitor Description

Compounds belonging to the group of VIMA/lactam copolymers described below, and mixtures thereof, are effective inhibitors of hydrate nucleation, growth, and/or agglomeration (collectively referred to as hydrate formation). A generic structure of the VIMA/lactam copolymers is depicted as follows:

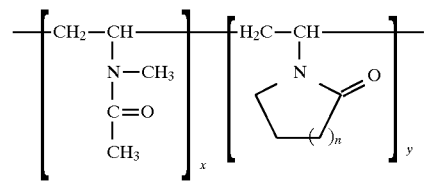

where n ranges from one to three and the sum of x and y is an average number sufficient to produce an average molecular weight between about 1,000 to about 6,000,000.

Where n=1 the resulting polymer is a copolymer of N-methyl-N-vinylacetamide and vinylpyrrolidone, VIMA/VP.

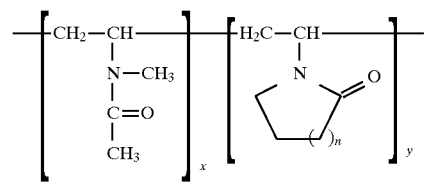

Where n=3 the resulting polymer is a copolymer of N-methyl-N-vinylacetamide and vinylcaprolactam, VIMA/VCap.

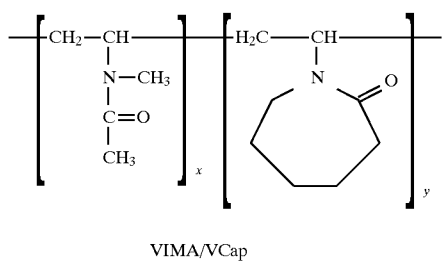

VIMA/VCap

These VIMA copolymers may be used in mixture with other substantially water soluble polymers, including but not limited to, poly(vinylpyrrolidone) (PVP), poly (vinylcaprolactam) (PVCap), polyacrylamides or copolymers of PVP, PVCap, or various polyacrylamides. Without limiting the scope of the invention, and for the purpose of illustrating the invention, three different ratios, 75:25, 50:50, and 25:75, of VIMA/VCap copolymers were evaluated.

INHIBITOR SYNTHESIS

General Procedure

N-methyl-N-vinylacetamide (VIMA) is commercially available from various specialty chemical suppliers such as, Aldrich Chemical (Milwaukee, Wis.). A free radical initiator, 2,2'-Azobis(2-methylpropionitrile) (AIBN), used for synthesizing these copolymers is also commercially available from Pfaltz and Bauer, Inc. (Waterbury, Conn.). N-vinylpyrrolidone (VP) and N-vinylcaprolactam (VCap) may be obtained commercially from Aldrich. N-vinylpiperidone may be synthesized according to procedures well known to those skilled in the art.

Polymers were synthesized using standard laboratory procedures. Benzene or low molecular weight alcohols were used as solvents. 2,2'-Azobis(2-methylpropionitrile) (AIBN) was used as the free radical initiator. The polymers were isolated and characterized using well-known techniques ($^{13}$C and $^1$H NMR and gel permeation chromatography) to confirm their structures. Some examples of synthesis procedures are provided below for convenience.

Synthesis Procedures

Synthesis of VIMA/VCap Copolymer

Ethanol was dried overnight over activated molecular sieves and then purged for about 4 hours with a stream of dry nitrogen gas. A 500 mL flask equipped with an overhead stirrer, condenser with drying tube, thermometer and nitrogen inlet was purged with nitrogen. 19.8 g (0.2 moles) N-methyl-N-vinylacetamide (Aldrich) and 27.8 g (0.2 moles) vinylcaprolactam (Aldrich) were loaded into the flask with about 250 mL ethanol. 0.4 g (0.002 moles) AIBN (Pfaltz and Bauer) was added and the reaction heated at 78° C. for about 8 hours. The reaction was cooled and the product isolated by vacuum evaporation of the solvent. The product was characterized by $^{13}$C nuclear magnetic resonance (nmr) spectroscopy and gel permeation chromatography (gpc).

Synthesis of VIMA/VP and VIMA/VPip Copolymers

N-vinylpyrrolidone (VP) and N-vinylpiperidone (VPip) can be copolymerized with VIMA using a synthesis procedure substantially similar to the one described above for synthesizing VIMA/VCap.

INHIBITOR EVALUATION

Miniloop Testing Procedure

One method for evaluating an inhibitor's effectiveness uses a bench-scale high pressure apparatus referred to as a miniloop apparatus. A miniloop apparatus consists of a loop of stainless steel tubing with about a one-half inch inside diameter and about ten feet in length. The loop also has a transparent section for observing the fluid flow in the loop and the onset of hydrate formation in the loop. Fluid comprising about 40% by volume SSW solution having about 3.5% total ionized salts, 40% by volume hydrocarbon condensate (i.e., $C_6+$), and 20% by volume hydrocarbon gas mixture is circulated around the loop at constant pressure. The hydrocarbon gas mixture is comprised of about 76 mole % methane, 9 mole % ethane, 7 mole % propane, 5 mole % n-butane, 2 mole % iso-butane, and 1 mole % of $C_5+$. The inhibitor is typically injected into the loop as an aqueous solution to produce the desired weight percent concentration of inhibitor in the aqueous sea salt/gas solution. Generally, many hydrate inhibitors are evaluated at about 0.5 wt % of the aqueous sea salt/gas solution.

The fluid is circulated at a constant velocity of about 2.5 feet/second. The loop and its pump lay in a controlled temperature water bath for controlling the temperature of the fluid circulating in the loop. The bath's water is circulated to ensure uniform temperature throughout the bath and rapid heat transfer between the bath water and the loop. As the loop temperature changes or as hydrates form, the gas volume in the loop will change accordingly. Therefore, to maintain constant pressure in the loop a pressure compensating device is required. Such a device can be comprised of a gas cell and a hydraulic oil cell separated by a floating piston. So as the gas volume in the loop changes, oil may be added or removed from the oil cell to produce a commensurate addition or removal of gas to the loop. Miniloop tests are typically run at a pressure of about 1,000 pounds per square inch gauge (p.s.i.g.). However, any pressure between 0 to 3,000 p.s.i.g. could be selected for evaluating an inhibitor's performance.

The temperature of the water bath is reduced at a constant rate, preferably about 6° F. per hour, from an initial temperature of about 70° F. At some temperature, clathrate hydrates begin to rapidly form. As the dissolved gas is used to form clathrate hydrates there is an abrupt and corresponding decrease in the volume of dissolved gas in the aqueous sea salt/gas solution. The temperature at which this abrupt decrease in the volume of dissolved gas is observed is known as the temperature of onset for hydrate formation ($T_{os}$). Recalling from the discussion above, the hydrate equilibrium dissociation temperature or $T_{eq}$ is the temperature below which hydrate formation is thermodynamically favored in an aqueous sea salt/gas solution without an inhibitor present. Therefore, another measure of an inhibitor's effectiveness is the difference between $T_{eq}$ and $T_{os}$ which is known as the inhibitor's subcooling, $T_{sub}$. Therefore, for a given pressure, the greater the subcooling the more effective the inhibitor. Typically, an aqueous sea salt/gas solution with no inhibitor present produces a $T_{sub}$ of about 6°–7° F.

Miniloop Test Results

Without limiting the scope of the invention, and for the purpose of illustrating the invention, three VIMA/VCap copolymers in different ratios were evaluated using the miniloop testing procedure described above. The results of these evaluations are provided below.

TABLE 1

MINILOOP TEST RESULTS WITH POLYMERIC INHIBITORS

| INHIBITOR | Ratio | CONC. WT % | MINILOOP SUBCOOLING TEMP. (°F.) |
|---|---|---|---|
| None | — | — | 7.0 |
| PVIMA | NA | 0.5 | 12.5 |
| PVCap | NA | 0.5 | 22.4 |
| VIMA/VCap | 75:25 | 0.5 | 26.5 |

TABLE 1-continued

MINILOOP TEST RESULTS WITH POLYMERIC INHIBITORS

| INHIBITOR | Ratio | CONC. WT % | MINILOOP SUBCOOLING TEMP. (°F.) |
|---|---|---|---|
| VIMA/VCap | 50:50 | 0.5 | 29.0 |
| VIMA/VCap | 25:75 | 0.5 | 30.0 |

Generally, copolymerizing VIMA with VCap produced an unexpected improvement in the lactam homopolymer's inhibitor performance. As indicated above, the VIMA homopolymer's subcooling was nearly 10° F. below the VCap homopolymer's subcooling. Consequently, it was unexpected that copolymerizing VIMA with VCap would enhance, rather than diminish the copolymer's hydrate inhibition activity as compared to the VCap homopolymer.

The Figure illustrates a best fit curve produced from the data in Table 1. This curve shows the synergistic inhibition effect that VIMA has when copolymerized with VCap. The linear dashed line connecting the subcooling points obtained for the VCap and VIMA homopolymers approximates the subcooling performance that was expected for VIMA/VCap copolymers with various mole fractions of VIMA. The dashed line represents the approximate arithmetic average in subcooling performance that was expected when VIMA was copolymerized with VCap. As the dashed line indicates, VIMA/VCap subcooling performance was expected to diminish proportionately with increasing mole fractions of VIMA.

It is believed that copolymerizing VIMA with other lactam monomers, such as N-vinylpyrrolidone (VP) and N-vinylpiperidone (VPip), would also demonstrate such a synergistic effect. However, the extent of the synergism observed for these other VIMA/lactam copolymers, VIMA/VP and VIMA/VPip, may vary from that observed for VIMA/VCap. In any case, the VIMA/VP and VIMA/VPip copolymers also are expected to produce some synergistic effect. Consequently, they are expected to have at least slightly improved subcooling performance over the arithmetic average produced by using the subcooling performance of each comonomer's homopolymer and the relative ratios of the comonomers comprising the VIMA/VP and VIMA/VPip copolymers.

The means and method of the invention and the best mode contemplated for practicing the invention have been described. It is to be understood that the foregoing is illustrative only and that other means and techniques can be employed without departing from the true scope of the invention claimed herein.

We claim:

1. A method of inhibiting the formation of gas hydrates in a petroleum fluid, having hydrate forming constituents and conveyed under conditions that would allow formation of gas hydrates, wherein the method comprises:
   introducing into the petroleum fluid a sufficient amount of an inhibitor to inhibit the formation of gas hydrates; and
   conveying the petroleum fluid;
   wherein the inhibitor is an N-methyl-N-vinylacetamide/N-vinyl caprolactam copolymer, containing from about 50% to about 25% N-vinyl amide units and from about 50% to about 75% N-vinyl lactam units.

2. A method for inhibiting the formation of clathrate hydrates in a fluid having hydrate-forming constituents, said method comprising treating said fluid with an effective amount of an N-methyl N-vinyl acetamide/N-vinyl caprolactam copolymer inhibitor, wherein the inhibitor is substantially water soluble and has an average molecular weight between about 1,000 and about 6,000,000.

3. The method of claim 2 wherein the fluid is a petroleum fluid conveyed under conditions that would allow formation of clathrate hydrates.

4. The method of claim 3 wherein the inhibitor is introduced in combination with a solvent selected from the group consisting of water, brine, sea water, produced water, methanol, ethanol, propanol, isopropanol, glycol, and mixtures thereof.

5. The method of claim 2 wherein the inhibitor is introduced into the fluid in an aqueous solution.

6. The method of claim 5 wherein the N-methyl N-vinyl acetamide/N-vinyl caprolactam copolymer contains from about 75% to about 25% N-methyl N-vinyl acetamide units and from about 25% to about 75% N-vinyl caprolactam units.

7. The method of claim 5 wherein the N-methyl N-vinyl acetamide/N-vinyl caprolactam copolymer contains from about 50% to about 25% N-methyl N-vinyl acetamide units and from about 50% to about 75% N-vinyl caprolactam units.

8. The method of claim 7 wherein the copolymer is present in an aqueous phase in the fluid at a concentration of about 0.5 wt %.

9. The method of claim 2 wherein the petroleum fluid is conveyed in a pipe.

10. The method of claim 9 wherein the inhibitor is introduced in combination with a solvent selected from the group consisting of water, brine, sea water, produced water, methanol, ethanol, propanol, isopropanol, glycol, and mixtures thereof.

11. The method of claim 9 wherein the inhibitor is introduced in an aqueous solution.

12. The method of claim 11 wherein the N-methyl N-vinyl acetamide/N-vinyl caprolactam copolymer contains from about 75% to about 25% N-methyl N-vinyl acetamide units and from about 25% to about 75% N-vinyl caprolactam units.

13. The method of claim 12 wherein the copolymer exhibits a subcooling of greater than 25° F.

14. The method of claim 11 wherein the N-methyl N-vinyl acetamide/N-vinyl caprolactam copolymer contains from about 50% to about 25% N-methyl N-vinyl acetamide units and from about 50% to about 75% N-vinyl caprolactam units.

15. The method of claim 14 wherein the copolymer is present in an aqueous phase in the fluid at a concentration of about 0.5 wt %.

16. A method for inhibiting the formation of gas hydrates in a petroleum fluid conveyed under conditions that would allow formation of gas hydrates, said method comprising:
   (a) producing an inhibitor composition comprising:
      (1) an N-methyl N-vinyl acetamide/N-vinyl caprolactam copolymer which is substantially water soluble and has an average molecular weight between about 1,000 and about 6,000,000; and,
      (2) a liquid used for introducing said inhibitor into said fluid;
   (b) introducing said inhibitor composition into said petroleum fluid stream, in an amount sufficient to inhibit the formation of gas hydrates; and
   (c) conveying the petroleum fluid.

* * * * *